Aug. 31, 1954
C. S. MORRISON
2,687,688
BALER, ESPECIALLY CONTROLLED RELEASABLE PLUNGER KNIFE
Filed March 22, 1950
2 Sheets-Sheet 1
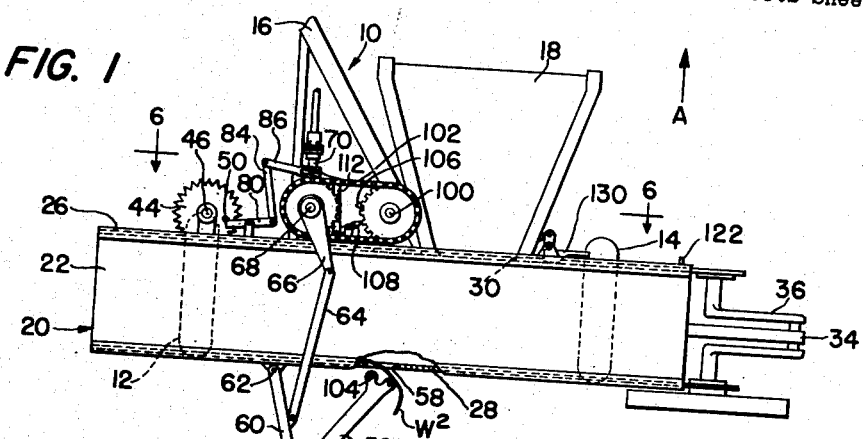
FIG. 1
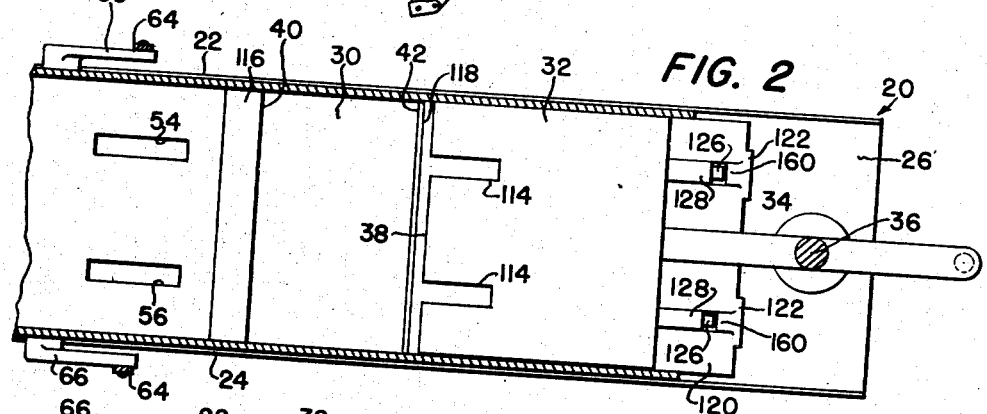
FIG. 2
FIG. 3
*INVENTOR.*
C. S. MORRISON
BY
ATTORNEYS

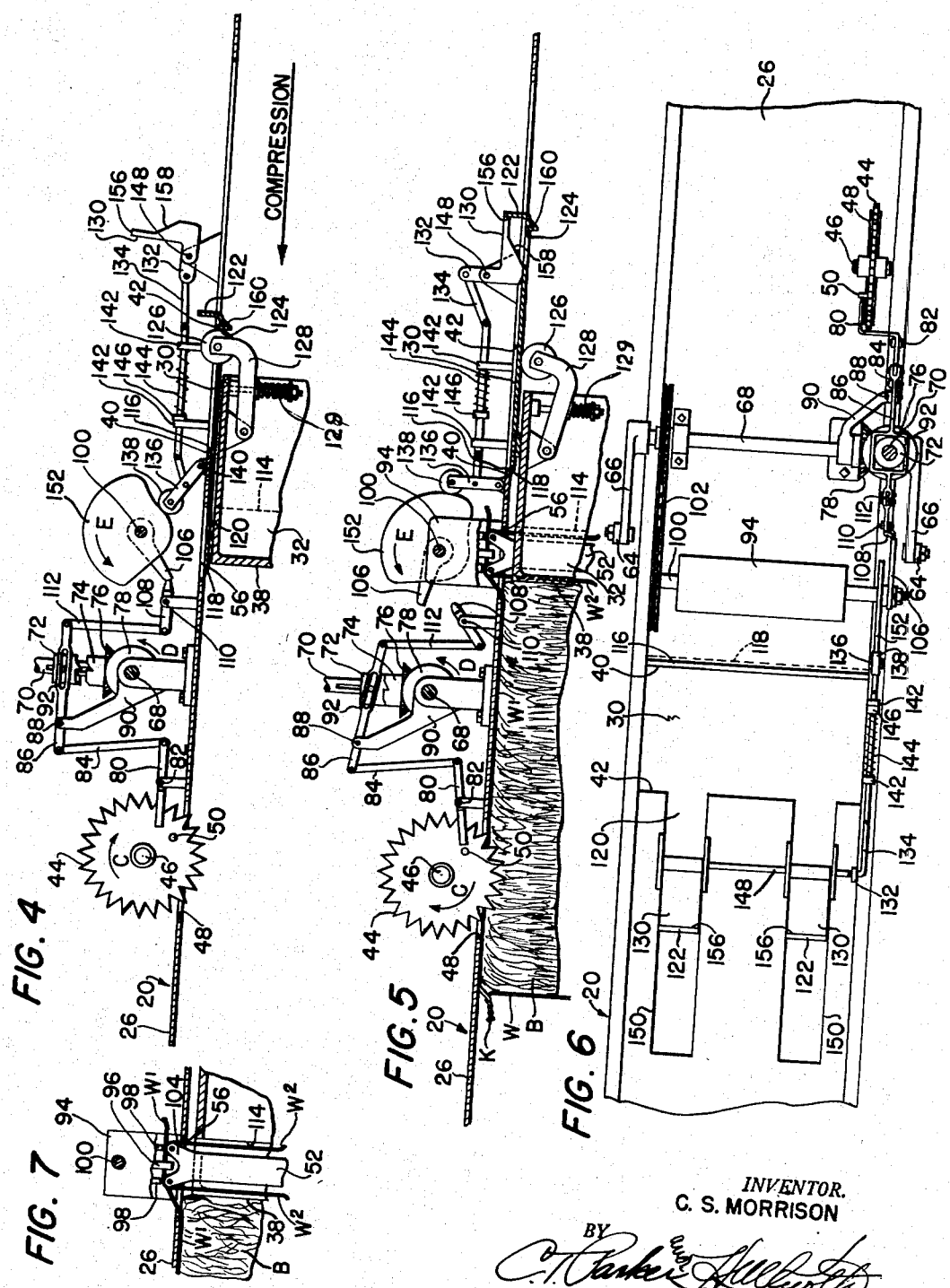

Patented Aug. 31, 1954

2,687,688

UNITED STATES PATENT OFFICE 2,687,688

BALER, ESPECIALLY CONTROLLED RELEASABLE PLUNGER KNIFE

Charles S. Morrison, Moline, Ill., assignor to Deere & Company, Moline, Ill., a corporation of Illinois Application March 22, 1950, Serial No. 151,200

13 Claims. (Cl. 100—4)

This invention relates to a baling press and more particularly to an auxiliary device such as a material-slicing knife releasably connected to the plunger of such press.

Although, as will be seen from the description to follow, the principles of the invention have relatively wide application, the herein disclosed form of the invention was designed primarily for use in balers of the pick-up type customarily employed on farms for the picking up and baling of hay, straw, etc. A typical baler of this character includes a mobile frame which may be drawn behind a tractor or vehicle or otherwise propelled over a field on which hay, straw, etc., is lying. The baler is equipped with pick-up mechanism for picking up the material from the ground and for delivering the material rearwardly through a feed opening into a bale chamber in which a baling plunger reciprocates to form the material into bales, the bales being successively tied and discharged at one end of the bale chamber. The bale chamber is normally made up of a plurality of walls arranged in such manner that the bale chamber is rectangular in section. One of the walls has a rectangular opening therein through which material is fed to be engaged by the leading or front face of the plunger as the plunger reciprocates. The stroke of the plunger on compression is such that the leading face of the plunger passes an edge portion of the opening along which material may be severed or sliced by means of a fixed knife along said edge portion and a cooperative knife carried by the plunger. The result is that a bale is made up of a plurality of charges each separated from the other because of the slicing or severing action occurring as the material is sheared between the fixed and reciprocating knives.

Some balers of the general character referred to are fully automatic; that is, they are provided with automatic typing mechanism which functions to tie a bale with wire or twine after the bale has attained a predetermined size, normally determined on the basis of length. A baler of this character will have its bale chamber provided with a feed opening in a vertical wall thereof. Hence, the shearing function of the knives will occur in the vertical plane of this wall. Further, since the baler is fully automatic, it is desirable to design the tying mechanism so that it will operate without requiring stoppage of the plunger. Typical tying mechanism includes one or more needles movable transversely of the bale case to bring a strand of twine or wire around the bale to the tying mechanism which is located on one wall of the bale chamber. Obviously, the needle must move through a portion of the zone in which the plunger moves on its compression stroke. The conflicting presence of the plunger and needle or needles in the same zone is resolved by providing the leading face of the plunger with slots or recesses to accommodate the needles. Hence, even though the needles are in tying position, the plunger may reciprocate without damaging the needles.

On the basis of a design such as that outlined above, it has heretofore been necessary to mount the needles for movement across the bale chamber in planes parallel to the plane of the wall in which the feed opening is formed. That is to say, if the feed opening is in a vertical wall, the needles move in vertical planes, normally from retracted positions below the bottom or floor of the bale chamber to tying positions projecting upwardly through the bale chamber. The reason for this is that the plunger must be slotted to receive the needles in planes parallel to the wall in which the feed opening is provided, because the shearing edges of the knives must be continuous. That is, the knife on the plunger could not be slotted to accommodate the needles, for it would lose its shearing function with the fixed knife along the feed opening.

Although balers of the general design referred to above have been found quite satisfactory in the past, it is recognized that certain disadvantages result from the requirement that the needles be placed for movement across the bale chamber in planes parallel to the plane of the wall in which the feed opening is formed. Among these disadvantages are increased height of the baler in order to place the feed opening in a vertical wall and to place the needles beneath or on top of the bale chamber. The frequently used alternate construction with needles on the side of the bale chamber and the feed opening in the top requires more elaborate pick-up construction to lift the material to a position above the bale chamber. It has been determined that a better bale can be formed in a bale chamber having its shorter dimension horizontal, because the feeding mechanism that feeds material through the feed opening would then have to travel through a shorter path. However, this would necessitate mounting of the needles so that they move in horizontal planes. As stated above, such movement of the needles would be impossible because of interference with the knife.

According to the present invention, these desirable results are made possible by the provision of a knife that is releasably carried by the plunger so that the knife can be stopped after it has performed its severing or shearing function, whereby the plunger may continue past the feed opening while the knife is retained in its stopped position. Thus, the shearing or cutting edge of the knife may be made continuous and the knife will lose none of its efficiency. At the same time, the plunger may be slotted as usual to receive the tying needles. Yet, the slots may be provided in planes normal or perpendicular to the plane in which the knife operates. In short, the plunger may function with respect to its operation in connection with the needles during the tying operation, just as if it had no knife thereon. Yet, a knife is provided that has all the functional characteristics of knives heretofore used for slicing the material to provide separate charges.

One of the primary objects of the present invention is to provide a baler construction in which the knife or equivalent auxiliary device is carried by the plunger for movement with the plunger, during part of the movement of the plunger, whereby the plunger may have a range of movement in which it moves without the knife.

It is an important object of the invention to provide a plunger and auxiliary device or knife of the character referred to which will result in over-all improvement of the operating efficiency of a baler without materially altering the basic design thereof. A further object is to utilize the characteristics of the present invention for the purpose of simplifying and lowering the cost of balers in general.

It is a further important object of the present invention to provide control means for actuating the knife-release means in response to conditions incident to the completion of the formation of a bale, so that the knife remains connected to the plunger throughout that portion of the operating cycle of the plunger preliminary to completion of the bale. In particular, actuation of the releasable means is made dependent upon initiation of operation of the tying mechanism, for it is only at this time that the typing mechanism needles move across the bale chamber in the path of reciprocation of the plunger and plunger-carried knife. In other words, the knife is carried for movement with the plunger at such times during which there will be no conflict between the knife and the tying mechanism needles.

The foregoing and other important objects and desirable features inherent in and encompassed by the invention will become apparent to those versed in the art as a preferred embodiment of the invention is disclosed in the following detailed description and accompanying sheets of drawings in which Figure 1 is a plan view showing the general construction of a typical baler equipped with mechanism incorporating the principles of the present invention;

Figure 2 is a fragmentary sectional view, on an enlarged scale, showing the relationship between the plunger and the material-feed opening, the plunger being shown at the end of its retracting stroke;

Figure 3 is a view similar to Figure 2, but showing the plunger at the end of its compression stroke;

Figure 4 is a fragmentary sectional view taken in a plane at right angles to the plane of the section of Figure 2 and showing schematically the control means for the releasable elements;

Figure 5 is a view similar to Figure 4 but showing the parts of the control means in different positions;

Figure 6 is a fragmentary front elevational view of the bale chamber, as viewed along the line 6—6 of Figure 1; and Figure 7 is a fragmentary sectional view showing the relationship between the components of the tying mechanism during the tying operation.

The baler structure chosen for the purposes of illustration is shown only generally and familiarity with the basic components thereof will be assumed. The baler may be of any suitable design, such as that shown in U. S. Patent 2,484,890, dated October 18, 1949, to Hill and may include main frame structure 10 carried on wheels 12 and 14 for advance over a field in the direction of the arrow A (Figure 1). The baler may be equipped with a draft frame 16 by means of which connection may be made to a tractor or other vehicular propelling source. As the baler is moved over a field of previously cut and windrowed hay or straw, such windrows are picked up by pick-up means 18 and delivered rearwardly to a bale case designated generally by the numeral 20.

The bale case includes means in the form of a plurality of walls 22, 24, 26 and 28 forming an elongated bale chamber generally rectangular in section. The walls 22 and 24 are respectively top and bottom walls and the walls 26 and 28 are respectively front and rear walls. The front wall 26 is provided with means, here in the form of a rectangular feed opening 30, through which material may be fed from the pick-up 18 into the bale chamber and into the path of a reciprocating plunger 32 that is driven or reciprocated lengthwise of the bale chamber in alternate compression and retraction strokes, or otherwise in succession and in successive phases of predetermined cycles, by means of a pitman 34 and a crankshaft 36, all of which may be generally conventional.

The plunger has a leading face 38 disposed transversely as respects the length of the bale chamber and which has a definite cycle of movement relative to vertical edges 40 and 42 that define the sides of the feed opening 30. These openings are spaced apart lengthwise as respects the extent of the bale chamber. When the plunger 32 is at the end of its retraction stroke, as shown in Figure 2, the leading face 38 is to the right of the edge 42, but when the plunger is at the end of its compression stroke (Figure 3) the leading face 38 moves considerably past the edge 40, which edge may be termed the edge more remote from the face 38 of the plunger when the plunger is at the end of its retracting stroke. In other words, the plunger operates to move across and beyond the opening 30 to receive material fed through the opening by the pick-up 18 and to compact or compress the material toward the left for effecting the formation of a bale, such a bale being designated at B in Figures 3, 5 and 7. The structural and functional characteristics just related briefly are typical of the standard or conventional balers.

Continuing for the moment with what may be termed conventional or known aspects of the structure disclosed herein for background purposes, reference will now be had to the means for tying a bale after it has attained a predetermined size characteristic on the basis of the charges of material compacted by the plunger on its compression strokes. In the baler structure illustrated herein, the front wall 26 is provided with what is known in the art as a measuring wheel 44 journaled at 46 and having a toothed or serrated periphery projecting through a slot 48 in the bale case wall 26 to be engaged by successive charges of material as this material is compacted into the finished bale B. That is to say, as the plunger moves on its compression strokes in the direction of the arrow identified by the legend "compression" in Figure 4, material carried along ahead of the leading face 38 of the plunger engages the serrated periphery of the measuring wheel 44 and causes incremental angular movement of the measuring wheel in the direction of the arrow C (Figures 4 and 5).

The measuring wheel is shown substantially in its initial position in Figure 4. The wheel is provided with a driving pin or lug 50 which is carried around by the wheel as the bale increases in length because of the addition thereto of new charges of material. The wheel is designed on the basis of a predetermined length of bale desired so that when the bale attains this length tying mechanism will be actuated to tie the bale. The tying mechanism illustrated here is merely representative of several forms that such tying mechanism could assume. That illustrated is based on the tying mechanism forming the subject matter of U. S. Patent 2,458,318, dated January 4, 1949, to Hill. Fundamentally, the tying mechanism includes a pair of needles 52 (only one of which is shown). Upper and lower slots in the front wall 26 are shown respectively at 54 and 56 in Figures 2 and 3. The lower slot 56 is visible in Figures 4, 5 and 7. An upper rear slot is visible at 58 in Figure 1. Although the companion rear slot is not shown, its presence will be apparent. The rear slots are respectively aligned with the front slots.

Each needle includes a mounting arm 60 pivoted at 62 on a vertical axis on the rear wall 28 of the bale case. The needles are swingable transversely across the bale case and through the respective alined slots by needle drive links 64 operatively connected to crank arms 66 mounted on a vertical shaft 68 ahead of the bale case. The shaft 68 derives its power from a longitudinally extending power input shaft 70 on which is slidably carried a shiftable clutch member 72 engageable with and disengageable from a driven clutch member 74 that is normally idle. The driven clutch member is preferably formed as part of a bevel pinion 76 that is in constant mesh with a bevel pinion 78 keyed to the lower end of the needle drive shaft 68.

As the bale is being formed, the clutch parts 72 and 74 are disconnected; hence, the needle drive shaft 68 is idle and the needles occupy the positions indicated in Figure 1. As the bale increases in length, the measuring wheel 44 is rotated until the pin 50 thereon moves into a position in which it is immediately subsequently capable of actuating mechanism for controlling the clutch 72—74. For the purposes of brevity and reduction in the complexity of disclosure, only a functionally possible mechanism has been illustrated. Equivalent mechanisms will be found to be disclosed in the U. S. patents identified above. For the present purposes, the schematic illustration will suffice.

A control lever 80 is pivoted intermediate its ends at 82 on the front wall of the bale case 20. One end of the lever 80 projects into the path of movement of the pin 50 on the measuring wheel. The other end of the lever is connected by a link 84 to a throw-out arm 86 pivoted intermediate its ends at 88 on a suitable bracket 90 which serves also to carry the needle drive shaft 68. The other end of the throw-out arm 86 may be provided with a conventional clutch collar 92 associated with the shiftable clutch part 72. When the measuring wheel 44 is moved sufficiently to bring the pin 50 into engagement with the free end of the lever 80, the lever is rocked in a counterclockwise direction as viewed in Figures 4 and 5, thus effecting clockwise rocking of the throw-out arm 86 about its pivot 88, following which engagement of the clutch parts 72 and 74 will occur. The shaft 68 is then driven through one complete revolution to bring the needles 52 across the bale case and then to return the needles to the position of Figure 1.

During one-half the cycle of movement of the needles 52, the tying operation is completed. As best shown in Figures 5 and 7, the needles move through the front wall slots 54 and 56 to be received partially by or within a tying mechanism housing 94 which may contain tying mechanism of the type forming the subject matter of U. S. Patent 2,456,476 patented December 14, 1948 to West et al. Briefly, the tying mechanism referred to and duplicated schematically here includes a slotted twister gear 96 and a pair of kinker and cut-off members 98. These components are suitably driven by means (not shown) connected to a vertical driven shaft 100 driven by suitable chain and sprocket means 102 from the needle drive shaft 68 (Figures 1 and 6).

As the bale B is being formed, it moves along within a loop of wire W (Figure 5), one run of which lies along the side of the bale case front wall 26, as at $W^1$ in Figure 5, and the other run of which lies along the inside of the bale case rear wall 28 and projects outwardly through the rear wall slot 58, as indicated at $W^2$ in Figure 1. It will be understood, of course, that there are two loops of wire W spaced apart vertically according to the spacing of the needles, which in turn are spaced apart vertically according to the spacing of the needle slots 54 and 56.

The wire parts $W^1$ continue outwardly respectively through the front wall slots 54 and 56 and lead to a suitable source of supply (not shown). As the bale B is increasing in length, it moves the wire loops W along inside the bale case to the left, drawing the wire portions $W^1$ and $W^2$ inwardly to accommodate for the increased bale length. The part $W^2$ is connected to another suitable source of supply (not shown), the two wire parts having been preliminarily joined or knotted as at K (Figure 5) to form the loop W, all of which is generally conventional. When the needle drive shaft 68 is driven to move the needles 52 across the bale case, the needles, by suitable wire-carrying means 104 thereon, pick up the wire parts $W^2$ and move them across the right-hand end of the bale and into the tying mechanism gear housing 94, carrying therealong the wire part $W^1$ encountered at the end of needle movement. The wire parts thus brought together are moved into the slotted twister gear 96, which is actuated by the tier shaft 100 to form in the wire parts $W^1$ and $W^2$ a twist or knot which joins the wire parts together around the bale B. The cut-off members 98 are subsequently actuated to sever the wires so that a knot or twist is formed at each side of the twister gear 96. One of the knots completes tying of the bale B and the other knot serves, like the preliminary knot K, to establish a subsequent loop for the formation of a subsequent bale. The details of the structure by means of which this detailed operation is carried out and an outline of the operation itself are contained in the above identified U. S. Patent 2,456,476.

The needle drive shaft 68 rotates in the direction of the arrow D (Figures 4 and 5); consequently, the tier shaft 100 rotates in the same direction. When each of the shafts 68 and 100 completes a single revolution, the clutch mechanism 72—74 is disengaged. For this purpose, the shaft 100 carries for rotation therewith a control cam 106 engageable at times with an arm 108 pivoted intermediate its ends at 110 on the front wall 26 of the bale case. The other end of the arm 108 is connected by a link 112 to that end of the throw-out arm 86 opposite to the connection between the arm 86 and the link 84. Before engagement of the clutch 72—74, the parts are as shown in Figure 4. After the clutch is engaged, the throw-out arm 86 operates through the link 112 to rock the arm 108 to the position shown in Figure 5. As the shaft 100 completes its one revolution, the control cam 106 engages the arm 108 and re-shifts the shiftable control member 72, thus disengaging the member from the driven clutch member 74. The parts are again restored to the position of Figure 4 until another bale is completed.

It will be apparent from an examination of Figures 1, 5 and 7 that the needles 52 move across the path of movement of the plunger 32 on its compression strokes. Obviously, some provision must be made for the conflicting presence of the needles 52 and plunger 32. Such provision is conventionally made in the form of a pair of needle-accommodating slots 114 formed in the leading face 38 of the plunger 32. It will be understood, of course, that the plunger moves continuously during the formation of a bale, whereas the needles move only once at the end of the completion of each bale as determined by the measuring wheel 44 and mechanism actuated thereby. In one type of baler, somewhere between ten and eighteen compression strokes of the plunger will be sufficient to form a bale of predetermined length according to the design of the measuring wheel 44, depending upon the size of the charges fed through the opening 30. It is expected that the tying operation will be completed between two successive compression strokes of the plunger. In short, the tying cycle is timed with operation of the plunger to the extent that the tying operation is completed during one cycle of operation of the plunger.

According to the present invention, the baler retains all the desirable characteristics of known balers and at the same time eliminates many disadvantages. One of the desirable features in a baler, at least according to one school of thought, is provision for slicing the charges of material as they are fed through the feed opening 30. In prior balers, this result was accomplished by the provision of a knife carried by the plunger for cooperation with a fixed knife along one edge of the feed opening 30. In the present case, a fixed knife 116 is provided along the edge 40 of the feed opening 30 and a second knife 118 is associated with the plunger 32. However, in the present case, the association between the plunger 32 and knife 118 includes releasable means whereby the knife is carried by the plunger during only certain portions of the operating cycle of the plunger. In brief, the knife 116 is carried by or driven from the plunger 32 during all phases of operation of the plunger except final movement of the plunger on its compression stroke just prior to tying of the bale B. The reason why disconnection between the plunger 32 and knife 118 is desired will be apparent from an examination of Figures 2-5, wherein it will be noted that the knife 118 projects slightly ahead of the leading edge 38 of the plunger 32 during normal association between the plunger and knife. Since the leading face 38 of the plunger moves considerably beyond the edge 40 and knife 116 of the feed opening 30, the knife 118 likewise moves past the line along which 40 and 116 lie. It will be further noted that the knife 118, at the end of the compression stroke of the plunger 32, is in the zone intermittently occupied by the needles 52. As previously stated, the plunger 32 is slotted at 114 to accommodate the needles. However, the knife 118 could not be similarly slotted to accommodate the needles, since the knife would lose most of its shearing or severing function with the knife 116. Hence, provision must be made for disconnecting the knife 118 from the plunger at the proper time so that at such proper time the plunger 32 may continue alone on its compression stroke without carrying therewith the knife 118. In short, the knife 118 is disconnected so that it does not move into the zone occupied by the needles 52 during the tying operation. This desirable result is accomplished as set forth below.

The knife 118 is carried by a knife carrier 120 disposed along the front face of the plunger 32 between that face and the inner surface of the bale case front wall 26. The knife carrier is somewhat longer than the plunger 32 and has its right-hand end provided with a flanged stop means 122 and with one of a pair of releasable elements, here including a slot or recess 124. The other of the releasable elements comprises a roller 126 carried by a pivoted and spring-loaded, as by a coiled compression spring 29, arm 128 connected to the plunger 32, as by the means illustrated in Figures 4 and 5. Since the arm 128 is spring-loaded, the roller 126 normally engages with the releasable element comprising the slot 124 in the knife carrier 120. Thus, reciprocation of the plunger 32 results in reciprocation of the knife carrier 120. Therefore, the knife 118 reciprocates in a cycle substantially coextensive with the cycle of reciprocation of the plunger 32 and functions to cooperate with the fixed knife 116 to shear successive charges of material fed through the feed opening 30 into the bale chamber.

It is a feature of the present invention to control the releasable elements 124—126 by means operative in response to conditions incident to the completion of the bale which, as aforesaid, includes an approximate predetermined number of strokes of the plunger 32 or, more fundamentally, determination on the basis of a size characteristic of the bale—here length. Further, the mechanism utilized to initiate operation of the tying mechanism is utilized to control the releasable elements referred to.

Part of the control means for the releasable means 124—126 comprises normally idle mechanism including a pivoted control member 130 in the form of a bell crank having one arm 132 connected by linkage 134 to an angularly movable arm 136 having at one end a roller 138 and pivoted at its other end at 140 to the front wall 26 of the bale case. A bracket having a pair of spaced-apart apertured ears 142 slidably carries part of the linkage 134, and a compression spring 144 and collar 146 provide means for normally maintaining the parts in the positions shown in Figure 4.

Specifically, there are two control members 130 keyed to a vertical shaft 148, the bell crank 132 being keyed to the lower end of the shaft so that only one linkage 134 will be needed (Figure 6). Likewise, there are a pair of release elements 124—126 and a pair of vertically spaced-apart stop flanges 122 at the right-hand end of the knife carrier 120, and the front wall 26 of the bale case is provided with a pair of lengthwise slots 150 to accommodate the flanged stops 122 as the knife carrier reciprocates with the plunger 32. These slots open lengthwise from the upright edge 42 of the feed opening 30, as best seen in Figure 6. The control members 130 are respectively alined with the slots 150.

During formation of the bale, the control mechanism is idle, since it is in turn controlled by the normally idle tying-mechanism-controlling means. That is, the spring 144 maintains the linkage 134 and roller arm 136 in the status of Figure 4. When the measuring wheel 44 causes actuation of the tying mechanism through engagement of the clutch 72—74, the tier shaft 100 is caused to operate the knife-control means 130—138 through the medium of a cam 152 keyed to the shaft 100. As best seen in Figure 4, the roller 138 on the control arm 136 normally rests idly against the cam and the control members 130 occupy the positions illustrated. Upon initiation of the operation of the tying mechanism, the cam 152 is rotated by the shaft 100 to move the roller arm 136 to the right and against the loading of the spring 144. This movement of the arm 136 operates through the linkage 134 to move the control members 130 to the position shown in Figure 5. Just prior to movement of the control members 130 to the position of Figure 5, the plunger 32 and knife 116 have moved simultaneously to the right or on their retracting strokes. Hence, the rollers 126 on the spring-loaded arms 128 will still be respectively engaged with the slots 124 in the knife carrier 120.

Each control member 130 is, as previously stated, in the form of a bell crank one arm of which is carried on the vertical shaft 148. The other arm of the bell crank is formed as a combined stop 156 and cam or ramp 158. Hence, when the control members 130 are moved to the position of Figure 5, the stops 156 are respectively in the paths of the stop flanges 122 on the knife carrier 120. This limits movement of the knife carrier 120 to the left. Since the rollers 126 project respectively through the slots 124, they are in positions to be engaged by or run up on the ramps 158. These ramps are so designed as to effect disengagement between the releasable elements 124—126. Therefore, simultaneously with stopping of the knife carrier because of engagement at 122—156, the rollers 126 are caused to leave the slots 124 via the ramps 158 so that driving of the knife and carrier 118—120 by the plunger 32 is discontinued, whereby the plunger 32 may continue alone on its compression stroke. It will be noted that discontinuance of operation of the knife and carrier 118—120 is effected just after completion of the shearing action between the knives 118 and 116 (Figure 5), whereas the plunger continues to the end of its compression stroke so that the plunger face 38 is considerably beyond or to the left of the upright edge 40 of the feed opening 30. In other words, the knife 118 is stopped short of the zone occupied by the needles 52 when the tying operation is being effected.

In another aspect of the invention, the knife carrier 120 constitutes a closure member alternately opening and closing the feed opening 30. This closure element is, of course, carried by the plunger 32 on the basis of the structural and functional characteristics hereinbefore outlined.

In further explanation of the showing in Figure 6, it should be stated that this view is a front view of the parts occupying the positions shown in Figure 5. That is, the stop flanges 122 on the knife carrier 120 are shown in engagement with the stop portions 156 on the control members 130.

After the tying operation is completed, the plunger 32 moves again on its retracting stroke. The rollers 126 ride along the inner face of the knife carrier 120 until they reach the slots 124, whereupon they are expected to drop into the slots and pick up the knife carrier for movement of the knife carrier and knife to the end of the retracting stroke with the plunger. In order to insure positive engagement between the plunger and knife carrier on retraction strokes of the plunger, the knife carrier is provided at each slot 124 with upstanding stop portions 160 which prevent the rollers from overrunning the slots 124. By the time that the plunger 32 is ready to start forward on a succeeding compression stroke, the tying operation will have been completed and the cam 152 will have rotated until it again occupies the position of Figure 4, whereupon the control mechanism 130—138 will be returned to the position of Figure 4 by the spring 144. Thereafter, the knife carrier and plunger will reciprocate together until another tying operation is initiated and completed. The advantage in having the plunger releasable from the knife only at the initiation of a tying stroke, or in response to other conditions incident to the completion of a bale, is that release is effected only when necessary, thus minimizing wear on such parts as the releasable elements normally interconnecting the plunger and knife carrier.

Other advantages and features of the invention not specifically enumerated herein will undoubtedly occur to those versed in the art, as likewise will numerous modifications and alterations in the preferred embodiment of the invention disclosed, all of which may be achieved without departing from the spirit and scope of the invention as defined in the appended claims.

What is claimed is:

1. A baler, comprising: means including a plurality of walls arranged to provide an elongated bale chamber of generally rectangular section; a bale-forming plunger reciprocable lengthwise of the chamber in alternate compression and retracting strokes and having a leading material-engaging face; means in one of the walls providing an opening through which material may be fed into the chamber into the path of movement of said leading face of the plunger on the compression stroke of the plunger, said opening having edges spaced apart lengthwise of the chamber and arranged so that the edge more remote from the plunger on its retracting stroke is passed by the leading face of the plunger on its compression stroke; a fixed knife carried by said edge; a second knife; means connecting the second knife to the plunger for reciprocation normally with the plunger to cooperate with said fixed knife for shearing of material fed through the feed opening, said connecting means including normally connected disconnectible elements; means associated with the bale case for tying a bale formed therein; means for operating the tying means at intervals; means operative in response to operation of the tying means for effecting disconnection of said disconnectible elements during operation of the tying means and prior to the attainment by the plunger of the end of its compression stroke; means for stopping movement of the second knife so that the plunger may continue alone to the end of its compression stroke; and means operative in response to a predetermined extent of operation of the tying means to effect reconnection of said disconnectible elements.

2. The invention defined in claim 1, further characterized in that: said disconnectible elements reciprocate normally in a defined path with the plunger and second knife; and said disconnection-effecting means includes a movable member normally out of said path but movable into said path to engage and disconnect one disconnectible element from the other.

3. The invention defined in claim 2, further characterized in that: the second knife is provided with an abutment normally clear of said movable member; and said movable member has an abutment thereon cooperative, when moved into the aforesaid path, to engage said second knife abutment for stopping the knife as the plunger continues on its compression stroke.

4. A baler, comprising: means providing a bale chamber; material compressing means movable in said chamber in a defined cycle including alternate material-receiving phases and material-compacting phases; means for feeding material to the material compressing means between material-receiving and material-compacting phases; means for tying a bale after compaction by the material compressing means; means for severing material fed to the material compressing means, including a pair of severing elements, one associated with the bale chamber and the other with the material compressing means and arranged for relative movement to sever material fed therebetween; means connecting one severing element to the material compressing means to be driven thereby normally through a cycle coextensive with that of the material compressing means, said connecting means including normally connected disconnectible and reconnectible elements; means for operating the tying means; and means operative in response to operation of the tying means to effect disconnection of said normally connected elements so that the material compressing means may operate in at least part of its cycle without driving said one severing element.

5. A baler, comprising: means providing a bale chamber; material compressing means movable in said chamber in a defined cycle including alternate material-receiving phases and material-compacting phases; means including a feed opening for feeding material to the material compressing means between material-receiving and material-compacting phases; means for tying a bale after compaction by the material compressing means; means for alternately opening and closing the feed opening, including a closure element separate from and movable at times relative to the material compressing means and arranged for movement relative to the feed opening; means connecting said element to the material compressing means to be driven thereby normally through a cycle coextensive with that of the material compressing means, said connecting means including normally connected disconnectible and reconnectible elements; means for operating the tying means; and means operative in response to operation of the tying means to effect disconnection of said normally connected elements so that the material compressing means may operate in at least part of its cycle without driving said closure element.

6. A baler, comprising: means providing a bale chamber; material compressing means movable in said chamber in a defined cycle including alternate material-receiving phases and material-compacting phases; means including a feed opening for feeding material to the material compressing means between material-receiving and material-compacting phases; means for alternately opening and closing the feed opening, including a closure element separate from and movable at times relative to the material compressing means and arranged for movement relative to the feed opening; means connecting said element to the material compressing means to be driven thereby normally through a cycle coextensive with that of the material compressing means, said connecting means including normally connected disconnectible and reconnectible elements; actuating means operatively associated with at least one of said disconnectible elements for selectively causing connection and disconnection of said disconnectible elements and normally idle during a predetermined number of cycles of the material compressing means; and means for operating said actuating means in response to conditions incident to the attainment by the material compressing means of a predetermined number of cycles whereby said actuating means effects disconnection of said normally connected elements so that the material compressing means may operate in at least part of its cycle without driving said closure element.

7. A baler, comprising: means providing a bale chamber; material compressing means movable in said chamber in a defined cycle including alternate material-receiving phases and material-compacting phases; means including a feed opening for feeding material to the material compressing means between material-receiving and material-compacting phases; means for alternately opening and closing the feed opening, including a closure element separate from and movable at times relative to the material compressing means and arranged for movement relative to the feed opening; means connecting said element to the material compressing means to be driven thereby normally through a cycle coextensive with that of the material compressing means, said connecting means including normally connected disconnectible and reconnectible elements; actuating means operatively associated with at least one of said disconnectible elements for selectively causing connection and disconnection of said disconnectible elements and normally idle during formation of a bale by the material compressing means; and means for operating said actuating means in response to conditions incident to the attainment by the bale of a predetermined size characteristic whereby said actuating means effects disconnection of said normally connected elements so that the material compressing means may operate in at least part of its cycle without driving said closure element.

8. A baler, comprising: means providing a bale chamber, including a bale-tying zone; material compressing means movable into said tying zone from a point remote from said zone and returnable to said point; means for feeding material into the bale chamber intermediate said tying zone and said point; tying mechanism, including means positionable at times in said tying zone; means on the material compressing means having slots to accommodate the tying means when both said tying means and material compressing means are in said zone; auxiliary means cooperative with the material-feeding means for stopping feeding of said material to the bale chamber; means for actuating said auxiliary means for movement normally into and out of said tying zone; and means operative in response to conditions incident to the presence of the tying means in the tying zone for confining said auxiliary means outside of said tying zone.

9. A baler, comprising: means including a plurality of walls arranged to provide an elongated bale chamber of generally rectangular section; a bale-forming plunger reciprocable lengthwise of the chamber in alternate compression and retracting strokes and having a leading material-engaging face; means in one of the walls providing an opening through which material may be fed into the chamber into the path of movement of said leading face of the plunger on the compression stroke of the plunger, said opening having edges spaced apart lengthwise of the chamber and arranged so that the edge more remote from the plunger on its retracting stroke is passed by the leading face of the plunger on its compression stroke; a fixed knife carried by said edge; a second knife; means arranging the second knife for reciprocation in alternate cutting and non-cutting strokes; drive means for reciprocating the plunger; second drive means for the second knife, including selectively connectible, disconnectible and reconnectible drive elements, normally connected to cause the second knife to reciprocate in cutting and non-cutting strokes respectively in time with the compression and retracting strokes of the plunger; means associated with the bale case for tying a bale formed therein; means for operating the tying means at intervals; means operative in response to operation of the tying means for effecting disconnection of said disconnectible elements during operation of the tying means and prior to the attainment by the plunger of the end of its compression stroke; means for stopping movement of the second knife so that the plunger may continue alone to the end of its compression stroke; and means operative in response to a predetermined extent of operation of the tying means to effect reconnection of said disconnectible elements.

10. A baler, comprising: bale-forming means including a chamber and a bale-forming member movable in the chamber to receive and compact material in said chamber; means for feed-vate, deactivate and reactivate said severing material fed to the chamber; drive means for said severing means selectively effective to activate, deactivate and reactive said severing means and normally operative to activate the severing means during movement of the bale-forming member; bale-tying means normally idle during compacting of the material by the bale-forming member, and operative in response to operation of the bale-forming member through a predetermined number of cycles to tie a formed bale; means engageable with the drive means for the severing means and operative in response to conditions incident to operation of the tying means to cause said driving means to deactivate the severing means; and means operative in response to conditions incident to a predetermined extent of operation of the tying means to cause said drive means to reactivate the severing means.

11. A baler, comprising: material compressing means for receiving and accumulating a plurality of successive charges of material into a bale; means for feeding successive charges of material to the material compressing means; means for operating the material compressing means through successive periods of predetermined length to form a plurality of successive bales, each bale including a plurality of charges of material; means for severing the charges of material fed to the material compressing means; drive means for the severing means selectively effective to activate, deactivate and reactivate the severing means and operative during each of the aforesaid periods to activate said severing means; and means cooperative between the material compressing means and said drive means for periodically causing the drive means to deactivate the severing means in response to conditions incident to the end of each period and to reactivate said severing means in response to conditions incident to the starting of each successive period.

12. A baler, comprising: means forming a material-receiving chamber having a feed zone and a tying zone spaced beyond said feed zone; material compressing means movable in successive cycles through said feed zone, into the tying zone and out of said tying zone; means for feeding material into said feed zone to be engaged by the material compressing means as said material compressing means moves through said feed zone and into the tying zone; bale-tying means normally idle during a predetermined number of cycles of the material compressing means and operative after said predetermined number of cycles to move into and then out of the tying zone; means for severing material fed to the chamber and movable at times into said tying zone and return; drive means for the severing means selectively effective to activate, deactivate and reactivate the severing means and normally effective to activate the severing means during said predetermined number of cycles of the material compressing means; means operative incident to deactivation of the drive means for the severing means for causing exclusion of the severing means from said tying zone; means engageable with the drive means and operative in response to conditions incident to movement of the tying means into and out of the tying zone for successively deactivating and reactivating the severing means.

13. A baler, comprising: material compressing means having a feed zone and a tying zone spaced from the feed zone, and also having means for moving material from the feed zone into the tying zone to accommodate such material in bale form; means for feeding material to the feed zone; bale-tying means normally idle during a predetermined material compressing period and operative after said period to move into said tying zone to tie a bale and then to move out of said tying zone; means for severing material fed to the chamber and movable in the tying zone during the bale-forming period while the tying means is out of said tying zone; means for selectively preventing and permitting operation of the severing means in the tying zone; and means connected to said selective means and operative in response to conditions incident to movement of the tying means into and then out of said tying zone for successively preventing and then permitting operation of said severing means in said tying zone.

References Cited in the file of this patent

UNITED STATES PATENTS

| Number | Name | Date |
|---|---|---|
| 515,786 | Nixon | Mar. 6, 1894 |
| 649,413 | Luzzatto | May 8, 1900 |
| 1,053,397 | Jackson | Feb. 18, 1913 |
| 1,201,695 | Case | Oct. 17, 1916 |
| 1,205,980 | Dudley | Nov. 28, 1916 |
| 1,231,354 | Hilton | June 26, 1917 |
| 1,579,777 | Pearson et al. | Apr. 6, 1926 |
| 1,714,331 | Tyler | May 21, 1929 |
| 2,293,679 | Barker | Aug. 18, 1942 |
| 2,362,861 | Russell | Nov. 14, 1944 |

FOREIGN PATENTS

| Number | Country | Date |
|---|---|---|
| 883,683 | France | Mar. 29, 1943 |